UNITED STATES PATENT OFFICE.

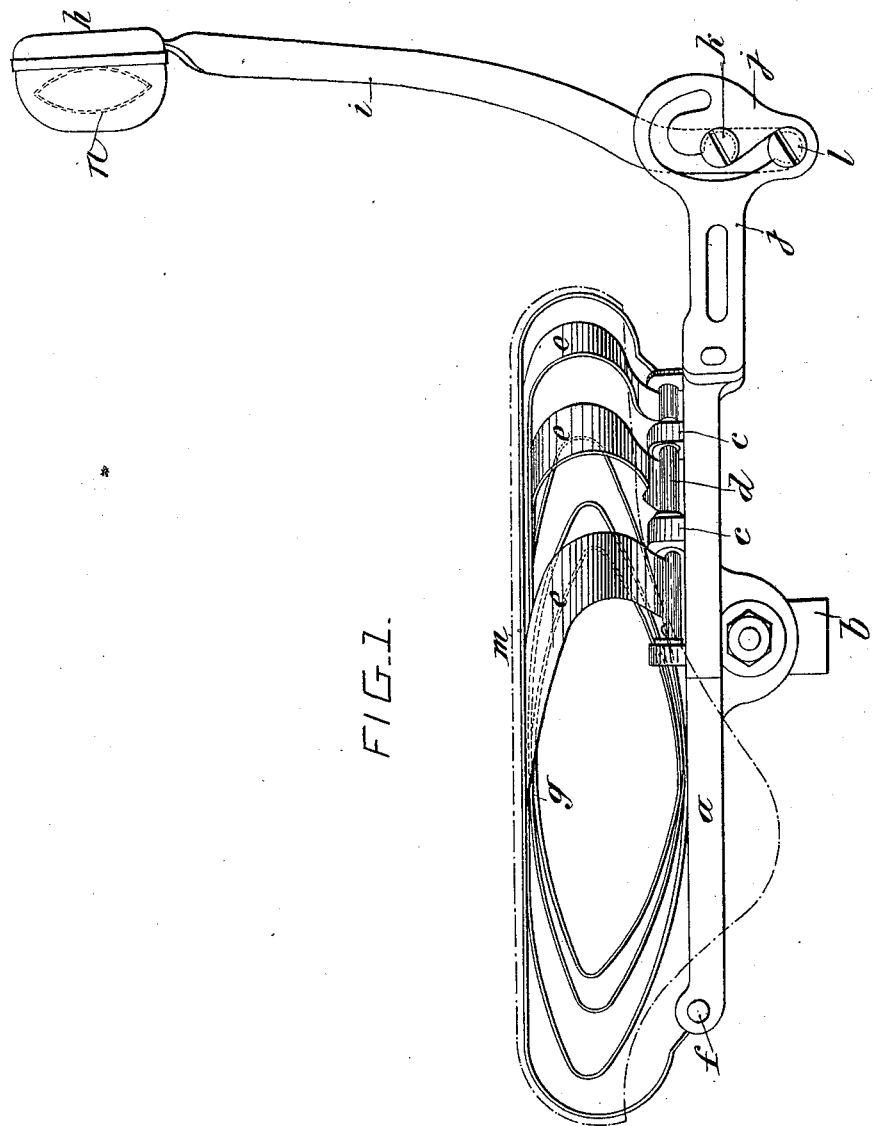

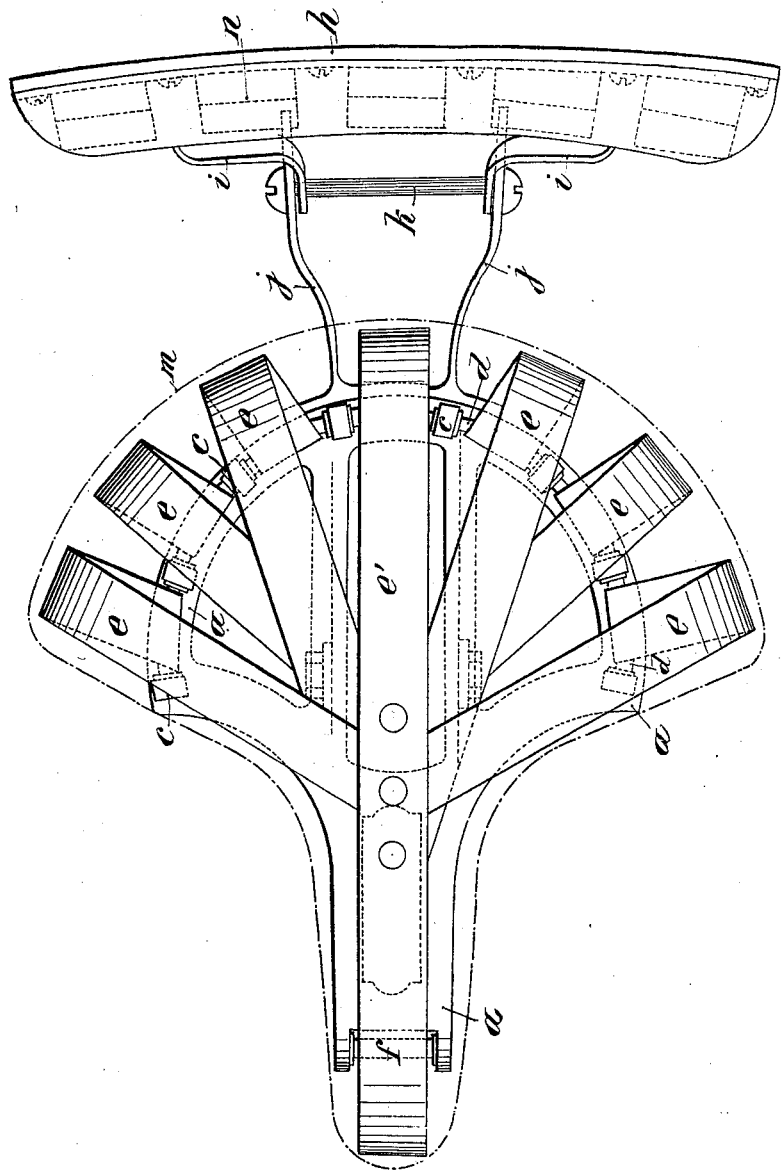

LOUIS LALLEMENT, OF PARIS, FRANCE.

SADDLE FOR MOTOR-CYCLES, &c.

SPECIFICATION forming part of Letters Patent No. 684,941, dated October 22, 1901.

Application filed July 16, 1900. Serial No. 23,731. (No model.)

*To all whom it may concern:*

Be it known that I, LOUIS LALLEMENT, of 50 Boulevard de la Villette, in the city of Paris, Republic of France, have invented Improvements in Seats or Saddles for Motor-Cycles, Velocipedes, and other Vehicles, of which the following is a full, clear, and exact description.

My invention relates to an improved seat or saddle for motor-cycles, velocipedes, &c., characterized by an arrangement of spring-strips capable of turning about their axes of suspension and by a detachable back capable of being quickly and readily raised or lowered.

My invention is illustrated in the accompanying drawings, which represent the improvements as applied to a seat for a motor-cycle.

Figure 1 is a side elevation, and Fig. 2 a plan of the seat.

The seat is constructed of a frame $a$, provided on its under side with a pair of lugs, between which is introduced the stirrup-piece $b$, mounted on the motor-cycle for the attachment of the saddle. The plate $a$ is further provided with bearings $c$, which carry the pivot or supporting-rod $d$ for the spring-strips $e$, which latter are curved at their ends, so as to turn upon said pivot $d$ between the bearings $c$. The horn of the saddle or front part of the seat carries a pin $f$, upon which is hinged the extremity of a central strip $e'$, serving to brace and support the strips $e$, which radiate from and are connected to it at the rear of the seat by the spindle $d$, as before mentioned. In order to impart to the springs $e\ e'$ an amount of elasticity proportionate to the load to be carried, one or more elliptic springs $g$ are placed beneath the strips, as shown. In the present instance a single elliptic spring $g$ is shown, which is directly beneath the central strip. The seat thus constructed is very elastic, the strips $e\ e'$ yielding more or less under the load and their curled ends turning upon their axes of suspension $d\ f$, the strips immediately returning to their normal position when the seat is vacated.

$h$ is the back of the seat, which is connected by means of side frames $i$ to two supporting-bars $j$ of special form, which are screwed or riveted to the rear end of the seat-frame $a$. These supporting-bars $j$ are each formed with a curved slot or opening of the form shown, in which engage pins $k\ l$, carried on the side bars $i$ of the back frame, the slots or openings terminating in notches which receive and retain the pins $k\ l$ when the seat is raised. The position these pins occupy in the curved slots or openings in the bars $j$ determines the position of the back, which is held in either the raised or lowered position. Thus in order to lower the back it is first lifted slightly, so as to raise the pins $k\ l$ out of their notches, and thereupon slight pressure of the hand suffices to turn the back down. The supporting-bars $j$ are also provided with slots, through which may be passed the straps of a saddle-bag or, in the case of a motor-cycle, the petroleum or other hydrocarbon reservoir.

The seat would generally be upholstered with leather, cloth, or other material $m$, the back $h$ being provided with springs $n$ beneath the covering for the purpose of increasing its resilience.

Saddles for velocipedes, motor-cycles, &c., thus constructed possess the advantages of great strength and lightness and are at the same time compact, while by reason of their elastic nature the motorist or cyclist is protected from shocks, even when the machine is traveling over very bad roads.

The backs being detachable, the seats may be applied with equal advantage for motor-cycles, as well as to velocipedes and other vehicles.

The form and details of construction of this improved seat may be varied according to the vehicle to which it is to be applied.

I claim—

1. A seat of the character specified which comprises a central supporting-strip pivoted at both ends and a plurality of strips each of which is connected at one end to the central supporting-strip and is pivoted at its opposite end.

2. A cushion-seat which comprises a base or frame provided with bearings or supports, a curved rod or pivot carried by said bearings, and springs the ends of which are formed with eyes pivotally mounted on said rod between the bearings, the other ends of the springs being connected with each other.

The foregoing specification of my improvements in seats or saddles for motor-cycles, velocipedes, and other vehicles signed by me this 17th day of March, 1900.

LOUIS LALLEMENT.

Witnesses:
 EDWARD P. MACLEAN,
 EDMOND COFFEE.